United States Patent [19]

Barker et al.

[11] 4,198,156
[45] Apr. 15, 1980

[54] OPTICS CONTAMINATION PREVENTION UTILIZING A COANDA AIR DEFLECTION SYSTEM

[75] Inventors: Robert B. Barker, Louisville; James B. Stack, Boulder, both of Colo.

[73] Assignee: International Business Machines Corporation, Armonk, N.Y.

[21] Appl. No.: 24,484

[22] Filed: Mar. 26, 1979

[51] Int. Cl.² ............................................. G03B 27/52
[52] U.S. Cl. ....................................................... 355/30
[58] Field of Search ............................ 355/30.3 R, 15

[56] References Cited

U.S. PATENT DOCUMENTS

| | | | |
|---|---|---|---|
| T940,022 | 11/1975 | Rodoa | 355/3 |
| 3,740,132 | 6/1973 | Komori et al. | 355/3 |
| 3,762,812 | 10/1973 | Wolff et al. | 355/30 X |
| 3,806,240 | 4/1974 | Tamai et al. | 355/13 |
| 3,914,046 | 10/1975 | Tanaka et al. | 355/15 |
| 3,941,471 | 3/1976 | Schatka et al. | 355/3 R |
| 4,017,170 | 4/1977 | Komori et al. | 355/3 R |

Primary Examiner—L. T. Hix
Assistant Examiner—W. J. Brady
Attorney, Agent, or Firm—Charles E. Rohrer

[57] ABSTRACT

In a document copier machine an almost completely enclosed optics module is provided to keep the optical components isolated from the remainder of the machine and thereby minimize contamination of the optical components. The described module has three large openings. One of these openings is an air inlet which opens to the exterior of the machine for bringing cooling air to a fan located inside the module. The second opening is an air outlet to allow the optics cooling air to exit. The third opening is critical to contamination and is an aperture which opens to the interior of the machine to allow illumination to pass from the optics module to a photoreceptive surface. In order to prevent air flow into the module through the aperture, louvers are situated at the fan to direct an airstream onto a first Coanda surface to move air toward the aperture. Light shields provided near the aperture to guard against stray light also provide an additional non-contamination function by capturing the airstream from the first Coanda surface and directing the airstream to the aperture. One of the shields can also act as a second Coanda surface in the transfer of air to the aperture. In that manner a positive flow of air out of the aperture is provided, thus preventing contamination of the optics module.

13 Claims, 4 Drawing Figures

OPTICS CONTAMINATION PREVENTION UTILIZING A COANDA AIR DEFLECTION SYSTEM

This invention relates to preventing contamination of optical components in an electrophotographic copier machine and more particularly to the channeling of air in an optics module by means of a Coanda ramp.

BACKGROUND OF THE INVENTION

Most electrophotographic copier machines utilize optical components such as lenses and mirrors to direct an image of an original document to an image-receiving, electrostatically-charged surface. Many copier machines then utilize a powdery substance called toner to develop an electrostatic image of the original. Unfortunately, the black powdery toner material is difficult to control and can escape from the photoreceptive surface into the body of the machine itself. Once in the body of the machine the toner can find itself deposited upon the lenses and mirrors of the optical system. When that happens the ability of the optical elements to transmit light is reduced and consequently the images of the original become less sharp over a period of time. Compounding the problem is the fact that toner is a thermoplastic material which when heated adheres to the surface upon which it is deposited. Since significant amounts of heat are produced within the body of a copier machine, the optical elements can become quite hot with the result that toner can be fused to the surface of the optical elements, causing decreased transmission of illumination and increased background on finished copy. To prevent the accumulation of heat on optical components, it is customary to provide a cooling fan to blow ambient air over these components.

U.S. Pat. No. 4,120,578; incorporated herein by reference, discloses an optical system which is relatively free from contamination since all of the optical components are located in an enclosed optical box. While not illustrated in that patent, the system also contains a fan to cool the optical elements. It may be observed that the optical box is not completely closed since a small aperture is located in one side of the optics box to allow the illumination to pass from the optical system onto a moving photoreceptive surface. As a consequence of that opening in the optics box and even though the optics box is somewhat pressurized by the cooling fan, toner powder still manages to enter the optical box through the aperture and contaminate the optical system. Entrance of the toner into the optical box through the aperture is promoted by a pumping action created by the movement of an optical scanning mechanism within the optical box. That movement tends to set up air currents within the box which pumps air through the aperture and toner contamination with it.

It is, therefore, an object of this invention to provide means for channeling air from a cooling fan to the aperture of an optics module so that the air forms a barrier to contaminants otherwise entering the module through the aperture.

Further, it is an object to channel the air without utilizing ductwork which would usurp space needed for machine conponents and interrupt the optical path.

SUMMARY OF THE INVENTION

This invention involves the provision of channeling air from a fan located within the optics module of an electrophotographic copier machine to the aperture of the module by directing the air over a Coanda surface from the fan to the vicinity of the aperture. Louvers are provided on the fan grill system to redirect a small amount of air toward the Coanda surface.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
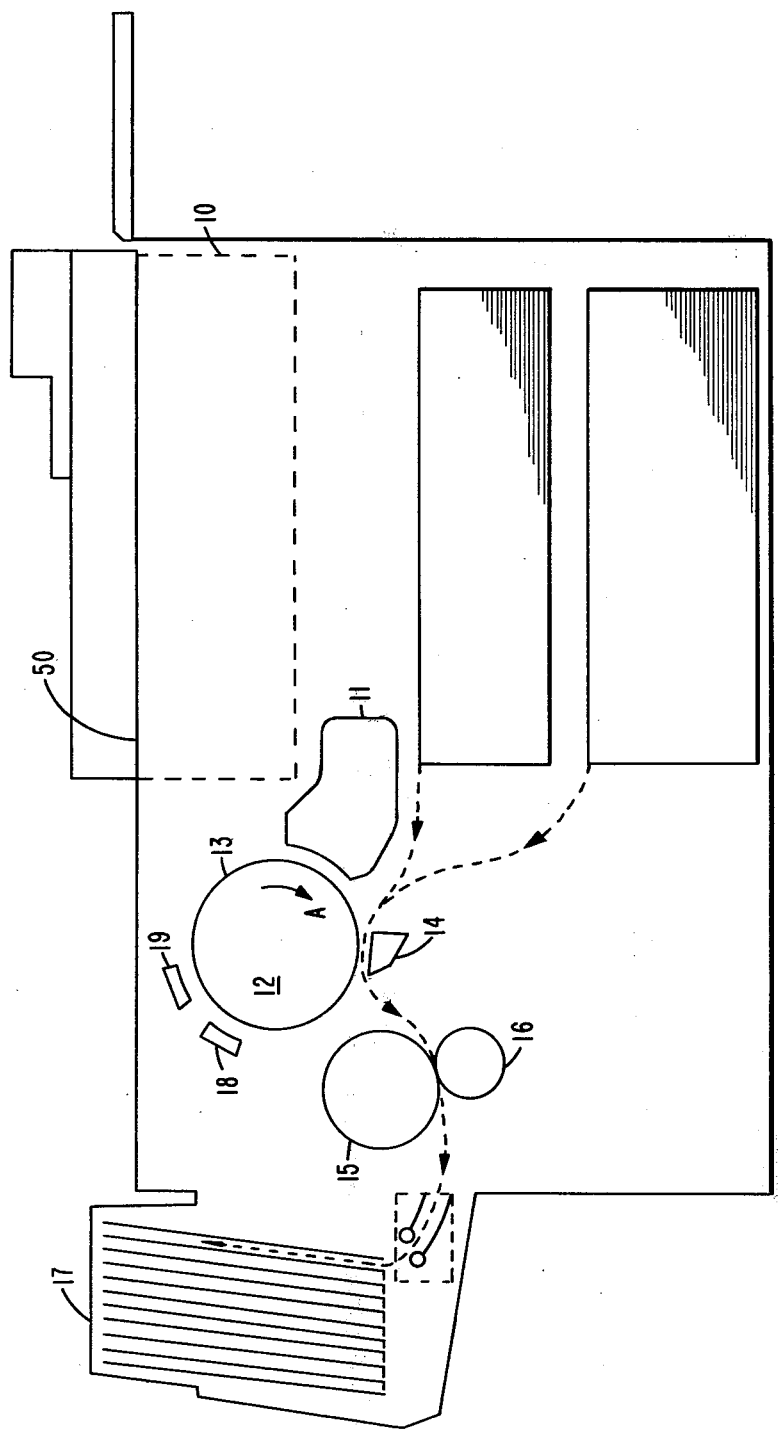
FIG. 1 shows the paper path of a typical electrophotographic copier machine.

FIG. 1 shows the paper path schematic of an electrophotographic machine of the transfer type using a two-cycle process. In order to use this machine an original document to be copied is placed upon a glass platen 50 whereat it is imaged by optical components included within an optics module 10 for presentation to a photoreceptive surface 13 mounted on drum 12. Drum 12 rotates in a direction A carrying with it the image of the original document, past a developing mechanism 11, at which toner powder is deposited upon the electrostatic image. As drum 12 continues to rotate the developed image comes under the influence of transfer corona 14 whereat the toner is transferred from the photoreceptive surface 13 to a receiving member such as copy paper. The receiving member continues to travel through fusing rolls 15 and 16 whereat the toner powder is permanently bonded to the copy paper. The copy paper eventually exits from the reproducing machine into a collator 17.

Once the image has been transferred to the copy paper by transfer corona 14, the drum 12 continues to rotate to a preclean corona 18 and then back to the developer/cleaner mechanism 11 where any remaining untransferred toner is cleaned from the photoreceptor. As drum 12 continues to rotate the photoreceptive material comes under the influence of charging corona 19, where the electrostatic surface is uniformly charged prior to receiving a second image of an original document through optics module 10. The process continues to repeat itself in order to produce additional copies.

Figure 2:
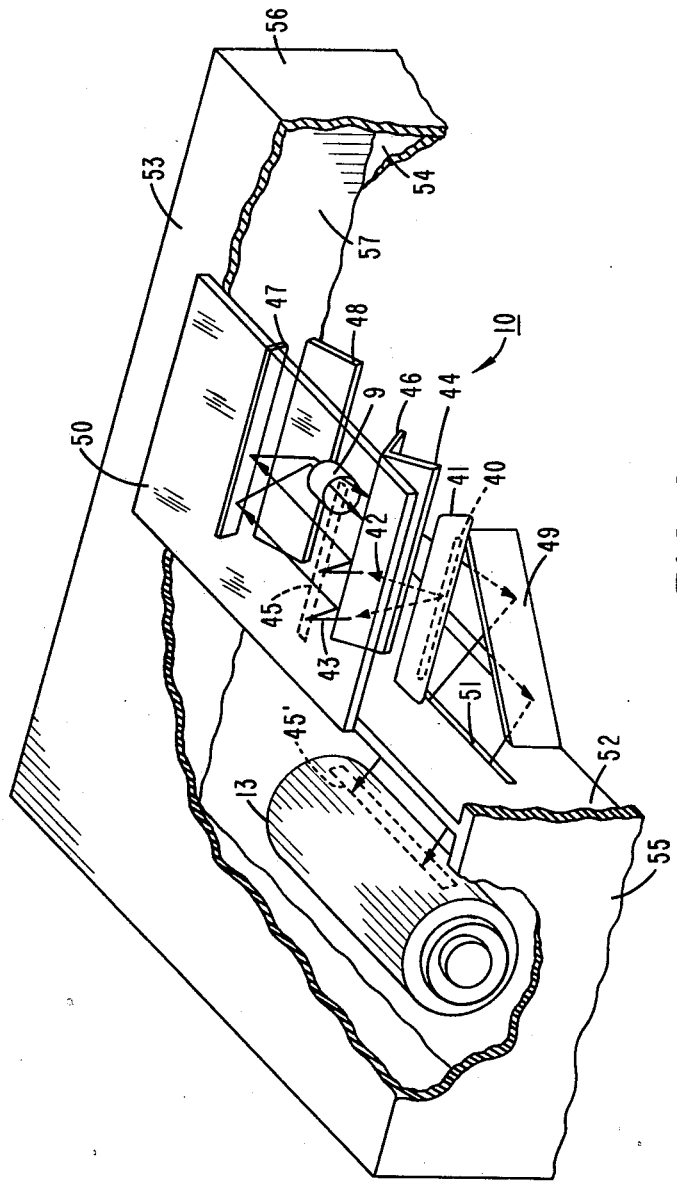
FIG. 2 shows the optics module for the electrophotographic machine.

The optics module 10 is shown in greater detail in FIG. 2 where document glass 50 is shown with scanning mirrors 44, 46, 47 and 48 located thereunder. These mirrors are mounted on two carriages which travel back and forth along rails underneath document glass 50, causing a line of light 45 to traverse the length and breadth of the original document to be copied. As the line of light traverses the document on glass 50, the rays are transmitted through the optical system to the photoreceptive surface 13.

In FIG. 2 a source of illumination 40, positioned within a reflector 41 is located on a first carriage together with mirrors 44 and 46. Mirrors 47 and 48 are located in a second carriage. The carriages and the rails upon which they ride are not shown in FIG. 2 for clarity. Lamp 40 produces rays of light exemplified by rays 42 and 43, which are reflected by mirror 44 onto the document glass 50. The rays of light from lamp 40 form a line of light 45 and are reflected from a document located on platen 50 to mirror 46, then to mirror 47, to mirror 48 and into lens 9. The rays of light pass through lens 9 to a stationary mirror 49 which reflects the light through aperture 51 in module 10 to photoreceptive surface 13 whereat an image line of light 45' is received. Mirrors 44 and 46 with lamp 40 are caused to scan the document on glass platen 50 at a rate related to the speed of photoreceptive surface 13 so that as the line of light 45 traverses the document from one end to the other a complete flowing image of the original document is placed on photoreceptive surface 13. As a first carriage containing mirrors 44 and 46 scans the document, a second carriage carrying mirrors 47 and 48 move in conjunction therewith in order that the optical path length from the document to the lens remains constant throughout the course of the scan. The optical considerations necessary to understand the scanning of a document and a production of its image are more fully explained in U.S. Patent 4,120,578; incorporated herein by reference.

Figure 3:
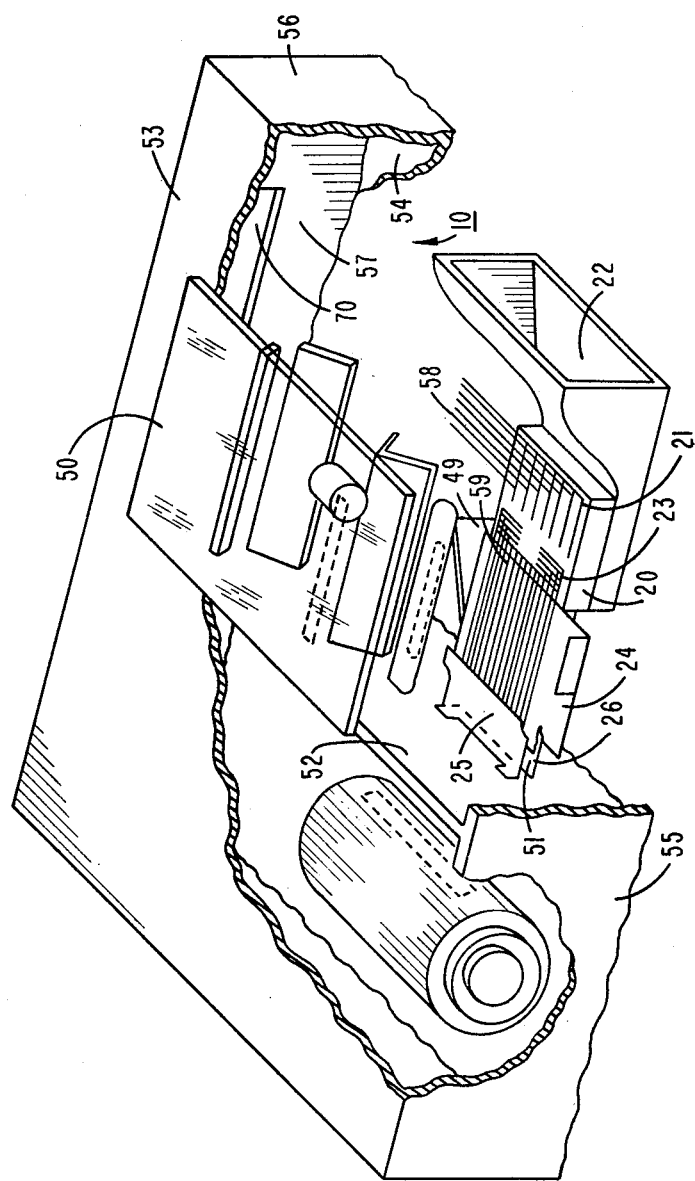
FIG. 3 shows a perspective view of the optics module with this invention incorporated therein.

FIGS. 1 and 2 show that the entire optics system is located within the framework of a box which separates the optical components from the remainder of the copier machine while FIG. 3 is a view similar to FIG. 2 with the invention herein shown in place. The top of the box is comprised of glass platen 50 and mounting surfaces 53; the bottom is formed from floor 54; and the walls are comprised of intersecting elements 52, 55, 56 and 57. The aperture 51 is in wall 52 while an air inlet 22 is located in wall 56 and an air outlet 70 is located in rear wall 57. The air outlet is preferably vented to the exterior of the machine and air inlet 22 receives ambient air from outside the machine. The opening to the interior of the machine is through aperture 51. By enclosing the optical elements within module 10, it was hoped to keep the optical components clean and free from contamination produced by toner. It was found, however, that air currents promoted by the moving carriages within the optics module 10 caused air to be pumped into the optics module through aperture 51. Measurements revealed that air flowed into the optics box at a rate of 1.53 meters per minute near one end of the aperture.

A fan 20 is located within module 10 connected to an inlet 22 and having louvers 21 on the top thereof. Air is pulled through inlet 22 and out the louvers 21 to blow through the optics module in order to cool the document glass, the lens, mirrors and the other components within the optics module 10. This airstream is illustrated at 58. In accordance with this invention, louvers 23, also located on top of fan 20, direct air out of the fan towards a plate 24 which serves as a Coanda surface by which the air is channeled from the fan towards aperture 51. This airstream is illustrated at 59. Prior to reaching aperture 51 the air flow leaves Coanda surface 24 and forms a jet stream between light shields 25 and 26 to reach aperture 51. A portion of the air flow may also adhere to the underside of shield 25 to continue a Coanda flow to the aperture 51.

Figure 4:
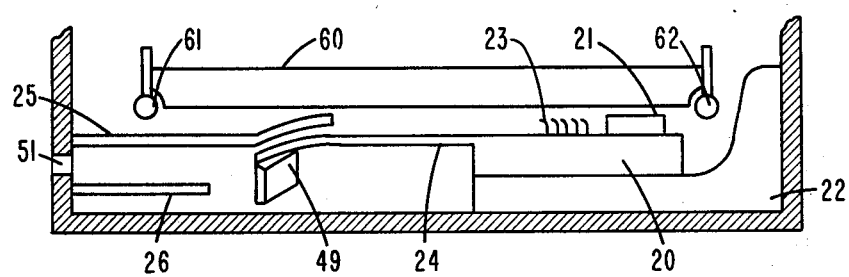
FIG. 4 shows a front view of the optics module with this invention.

In FIG. 4 a front view of the optics module shows the scanning carriage 60 mounted on rails 61 and 62. The clearance between the top of fan 20 and the bottom of scanning carriage 60 is in the order of a few millimeters, illustrating the fact that there is no space for a duct to channel air exiting from fan 20. Consequently, in order to solve the contamination problem, louvers 23 are place atop fan 20 in order to redirect air leaving the fan onto a Coanda surface 24. A Coanda airstream along the top of surface 24 may be transferred to plate 25 where it may continue to flow according to the Coanda effect along the bottom of plate 25 to the aperture 51. Shield 26 is located near the bottom of the aperture and serves to capture air flow now continuing along the underside of shield 25 and thus acts to direct a jet of air toward aperture 51. The fixed mirror 49 is also shown in FIGS. 3 and 4. It should be noted that the aperture 51 is located several millimeters below the exit plane of fan 20.

To summarize what has been accomplished in this invention and referring again to FIG. 4, it can be seen that air exiting from fan 20 is blown vertically upwardly toward the louvers while the aperture to which the air must be directed is located below the plane of the louvers. Therefore, if air is to be channeled to the aperture, its direction must be reversed. Additionally, the clearance between the top of the fan surface and the bottom of the scanning carriages is only a few millimeters. Thirdly, the rays of optical light passing from lens 9 to aperture 51 cannot be blocked by ductwork. To work within these constraints and solve the contamination problem, the inventors herein ingeniously supplied louvers atop the exit of fan 20 to redirect the upwardly moving air to contain a horizontal component flowing in a direction toward the aperture. A portion of that air is then picked up by a Coanda surface 24 and caused to flow in a thin stream across the body of the optics box toward the aperture 51. Since, however, the air is moving across the upper surface of Coanda plate 24, it must be transferred to the underside of a second plate 25 or directed as a jet stream in order that the rays of light are not interferred with in reaching aperture 51. By providing plates 24, 25 and 26, a system for directing air from a fan across the entirety of an optical box to an exiting aperture was provided without the use of ductwork.

Measurements of air flow taken on the system shown in FIGS. 3 and 4 revealed that exiting velocities of air from aperture 51 range from 30.5 to 51.8 meters per minute at various points along the aperture. All velocities were measured perpendicular to the aperture. As noted above, prior to the installation of this invention, near one end of the aperture air was flowing into the optics box at a rate of 1.53 meters per minute. At that same point, with this invention installed, air now flows out of the optics box at 42.7 meters per minute. Additional air velocity measurements were taken at various points on the Coanda ramp 24. It was found that air velocities ranged from 99.1 meters per minute to 198.1 meters per minute adjacent to the surface of ramp 24. At 12 mm above that ramp, air velocities ranged from 54.9 meters per minute to 175.3 meters per minute, showing that a very high velocity boundary layer of air was produced across the Coanda ramp 24.

Once the flowing Coanda airstream reaches the end of ramp 24, it can be channeled to the aperture 51 either by transferring the Coanda air flow to the underside of light shield 25 or by jet stream produced by the air flowing off the end of ramp 24. The configuration of ramp 24 and light shield 25 largely determines which of these effects carry the majority of the air flow toward aperture 51. Refer to FIG. 4 and note that the end of ramp 24 is shown with a curvature bending downwardly. Assuming that the radius of curvature is not so abrupt as to lose the Coanda airstream from its surface, the curvature will cause the Coanda airstream to be directed downwardly toward shield 26 from which it would be redirected toward aperture 51 as a jet airstream. On the other hand, if the end portion of plate 24 has a smaller curvature such that the Coanda airstream is directed onto the underside of light shield 25 and further assuming that the distance between plates 24 and 25 is small, e.g., 10 mm, the Coanda airstream will adhere in large amount to the underside of surface 25 and consequently be directed by that surface toward aperture 51. Either of the two approaches is adequate for continuing the transmission of air to the aperture 51 and preventing contamination from entering the optics box therethrough.

Thus, a system has been provided to prevent toner from entering an enclosed optics module through an aperture by utilizing air from an already existing fan whose primary function is to cool the optics system, and by directing that air without the use of mechanical ductwork and through the use of a Coanda surface and a louvered fan grill, to redirect a small portion of the cooling air to an aperture which is located significantly below the exit plane of the cooling fan.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a document copier machine, an enclosed optics module comprising:

a glass platen forming at least a part of the top of said module;

a floor plate forming the bottom of said module;

walls extending between the top and bottom of said module and cooperating to enclose said module; except for an aperture to allow illumination to leave said module, an air inlet and an air outlet;

said module containing optical elements for transmitting illumination from said glass platen to said aperture and further containing fan means connected to said air inlet for blowing cooling air across said optical elements; and a first Coanda surface means for receiving at least a portion of said cooling air from said fan means to provide an airstream flow to said aperture so that said cooling air flows out of said aperture across the entire width thereof to prevent contamination from entering said module through said aperture.

2. The optics module of claim 1 further including a second Coanda surface means for receiving at least a portion of said airstream flow from said first Coanda surface means.

3. The optics module of claim 2 wherein said airstream flows across the top of said first Coanda surface and is transferred to the bottom of said second Coanda surface whereby the airstream moves from said fan to said aperture without blocking the passage of said illumination.

4. The optics module of claim 1 further including a shield means extending into said optics module from said aperture for receiving said airstream from said first Coanda surface for directing said airstream to said aperture.

5. The optics module of claim 1 further including a system of louvers located at the exit of said fan for directing a portion of said cooling air onto said first Coanda surface.

6. The optics module of claim 2 further including a system of louvers is located at the exit of said fan for directing a portion of said cooling air onto said first Coanda surface.

7. The optics module of claim 3 further including a system of louvers located at the exit of said fan for directing a portion of said cooling air onto said first Coanda surface.

8. The optics module of claim 4 further including a system of louvers located at the exit of said fan for directing a portion of said cooling air onto said first Coanda surface.

9. The optics module of claim 1 wherein said optical elements include scanning carriages for moving across the glass platen within the confines of said module.

10. The optics module of claim 2 wherein said optical elements include scanning carriages for moving across the glass platen within the confines of said module.

11. The optics module of claim 3 wherein said optical elements include scanning carriages for moving across the glass platen within the confines of said module.

12. The optics module of claim 4 wherein said optical elements include scanning carriages for moving across the glass platen within the confines of said module.

13. The optics module of claim 5 wherein said optical elements include scanning carriages for moving across the glass platen within the confines of said module.

* * * * *